US007249876B2

(12) United States Patent
Jong

(10) Patent No.: US 7,249,876 B2
(45) Date of Patent: Jul. 31, 2007

(54) LAMP HOLDER FOR HIGH INTENSITY DISCHARGE LAMP

(75) Inventor: Cheng-Chao Jong, Ping-Chen (TW)

(73) Assignee: Kong Li Technology Co., Ltd., Taoyuan County (TW)

( * ) Notice: Subject to any disclaimer, the term of this patent is extended or adjusted under 35 U.S.C. 154(b) by 0 days.

(21) Appl. No.: 11/268,208

(22) Filed: Nov. 5, 2005

(65) Prior Publication Data

US 2007/0103919 A1 May 10, 2007

(51) Int. Cl.
*B60Q 1/00* (2006.01)

(52) U.S. Cl. ...................... 362/519; 362/514; 362/516; 362/548; 362/549

(58) Field of Classification Search ................ 362/647, 362/519, 514, 516, 548, 652, 655; 313/218.02
See application file for complete search history.

(56) References Cited

U.S. PATENT DOCUMENTS 5,029,057 A * 7/1991 Devir et al. ................ 362/645
5,463,541 A * 10/1995 Greene ........................ 362/369
5,855,430 A * 1/1999 Coushaine et al. ......... 362/519
6,267,489 B1 * 7/2001 Yamamoto .................. 362/519
6,356,009 B1 * 3/2002 Coushaine et al. .... 313/318.01
6,710,522 B2 * 3/2004 Fransen ...................... 313/113

* cited by examiner

*Primary Examiner*—Sandra O'Shea
*Assistant Examiner*—Anabel Ton

(57) ABSTRACT

An improved lamp holder for a high intensity discharge (HID) lamp includes a base and a metallic positioning member, in which the metallic positioning member includes a vibration-damping clamping ring having three extension feet extending outwards and downwards from a bottom rim of the clamping ring and inserted into their respective corresponding insertion slots of the base; and the clamping ring clips a lamp tube.

3 Claims, 4 Drawing Sheets

LAMP HOLDER FOR HIGH INTENSITY DISCHARGE LAMP

BACKGROUND OF THE INVENTION

1. Field of the Invention

The present invention relates to a high intensity discharge (HID) lamp and in particular to an improved lamp holder for the HID lamp.

2. The Prior Arts

Currently, halogen lamps are generally used as car headlamps. It cannot provide with higher brightness due to limitation of tungsten filament material. A conventional 60 W halogen headlamp may generate a color temperature of about 3,000-3,200 K; if it is replaced with 100 W, the color temperature is at most increased to about 3,400-3,800 K. Hence, tungsten filament lamps have limitation for being employed as higher brightness car headlamps. Thus, other types of lamps, which can be substitutes for halogen lamps and provide higher brightness with low power consumption, are developing.

An existing HID lamp employed in vehicles is illustrated as an example of luminescence theory. Gases between two electrodes are excited by electrons and then ionized so as to excite phosphor to emit light. The HID lamps may be classified into low HID lamps, such as fluorescent lamps, and high HID lamps, such as high intensity mercury lamps, high intensity sodium vapor lamps and metal halide lamps. The HID lamp for vehicles is one of the high intensity discharge lamps. Xenon is injected into a crystal ball inside a quartz tube, and a stabilizer is employed to lift a voltage of a vehicle battery from 12 V to 23,000 V so that Xenon is excited by electrons and then ionized to generate electric arc and emit light.

HID lamps are brighter by three times than conventional halogen lamps, longer service life by five times than the conventional halogen lamps, and half power consumption as much as the conventional halogen lamps. As a result, it gradually becomes popular in the market of vehicle lamps.

As shown in FIG. 1, a conventional HID lamp mainly comprises a sleeve 1, a lamp tube 2, a lead wire 8, a metallic positioning member 6 having a vibration-damping clamping ring 5, and a base 3. The positioning member 6 has a ditch 4 on a bottom ring thereof for receiving the sleeve 1, and three iron sheets extending inwards and upwards from a top rim of the bottom ring, which are distributed in uniform and coupled with the clamping ring 5. The base 3 has a recess and a circular ring 7 received in a center of the recess. The positioning member 6 is received in the recess of the base 3, and the lamp tube 2 goes through the clamping ring 5 and then is mounted to the circular ring 7 of the base 3; in the meantime the sleeve 1 is mounted to the ditch 4 of the positioning member 6.

FIG. 2 illustrates a perspective view of the conventional HID lamp after assembled.

In the conventional lamp holder design, the bottom ring of the metallic positioning member 6 has to be manufactured to match with the recess of the base 3, which has a larger inner diameter, thereby having higher manufacturing cost. Next, the three iron sheets are used to support the clamping ring 5 to fix the lamp tube 2, which has not only higher manufacturing cost, but also more complicated structure. Thus, it is desired to provide an improved lamp holder for a HID lamp, which has structure and lower manufacturing cost.

SUMMARY OF THE INVENTION

A primary objective of the present invention is to provide an improved lamp holder for a HID lamp, which has simpler structure and lower manufacturing cost.

To achieve the above-mentioned objectives, in accordance with the present invention, an improved lamp holder for a HID lamp comprises a base having a recess, a circular ring received in a center of the recess and receiving an end of a lamp tube, three insertion slots arranged on an periphery of the recess, and an insertion hole located at the periphery of the recess for receiving a sleeve; and a metallic positioning member comprising a vibration-damping clamping ring having three extension feet extending outwards and downwards from a bottom rim of the clamping ring, which are mounted to the corresponding insertion slots of the base whereby the positioning member is coupled with the base. The clamping ring also has a plurality of protrusions protruding inwards from a top rim of the clamping ring whereby after the lamp tube goes through the clamping ring, the protrusions clips the lamp tube and forms a buffer holder between the lamp tube and the clamping ring, thereby preventing the lamp tube from directly colliding with the clamping ring due to vibration.

Further, the extension feet each have two protruding hooks provided at both sides thereof to prevent the extension feet of the positioning member from escaping from the insertion slots of the base after assembled. The extension feet each have a triangular portion at a free end thereof so as to be easily inserted into their corresponding insertion slots of the base, which can save much time of assembling in mass production.

In comparison with the prior art, the present invention has simper structure, lower manufacturing cost, and more stable coupling of the positioning member with the base and the lamp tube due to the designs of protruding hooks on the extension feet and the protrusions on the clamping ring, which can secure the lamp tube and prevent the lamp tube from escaping from the base due to violent vibration.

The present invention will be apparent to those skilled in the art by reading the following detailed description of a preferred embodiment thereof, with reference to the attached drawings, in which:

DETAILED DESCRIPTION OF THE PREFERRED EMBODIMENT

Figure 1:
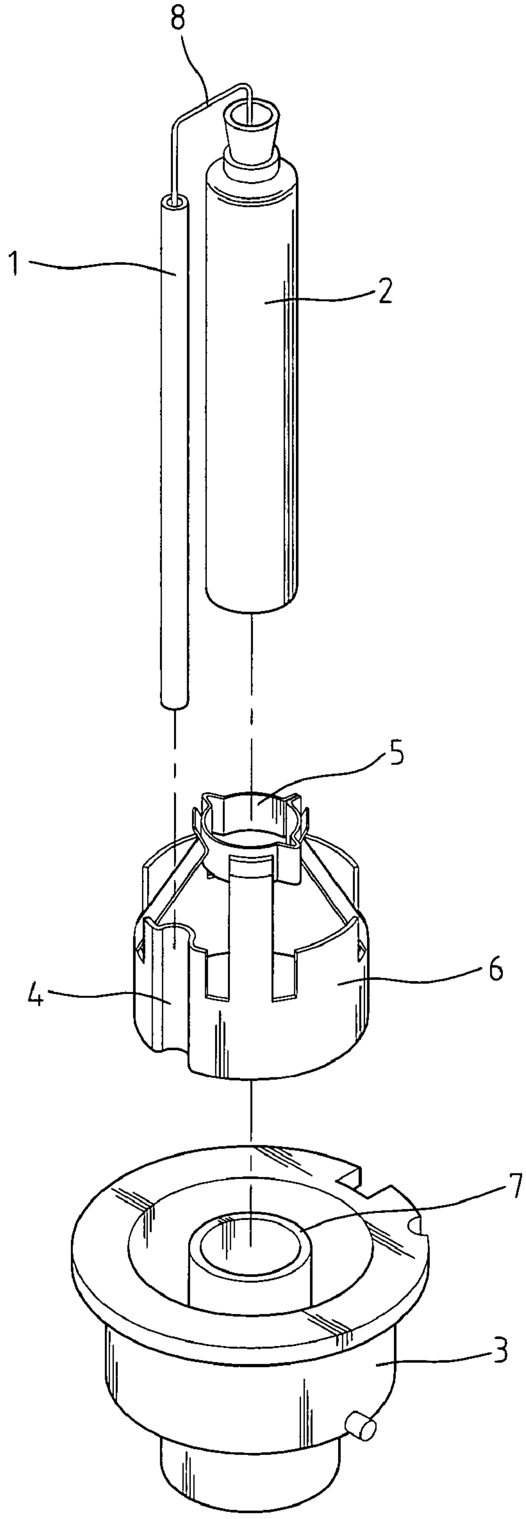
FIG. 1 (PRIOR ART)
FIG. 1 is an exploded view of a HID lamp in accordance with a prior art.
Figure 2:
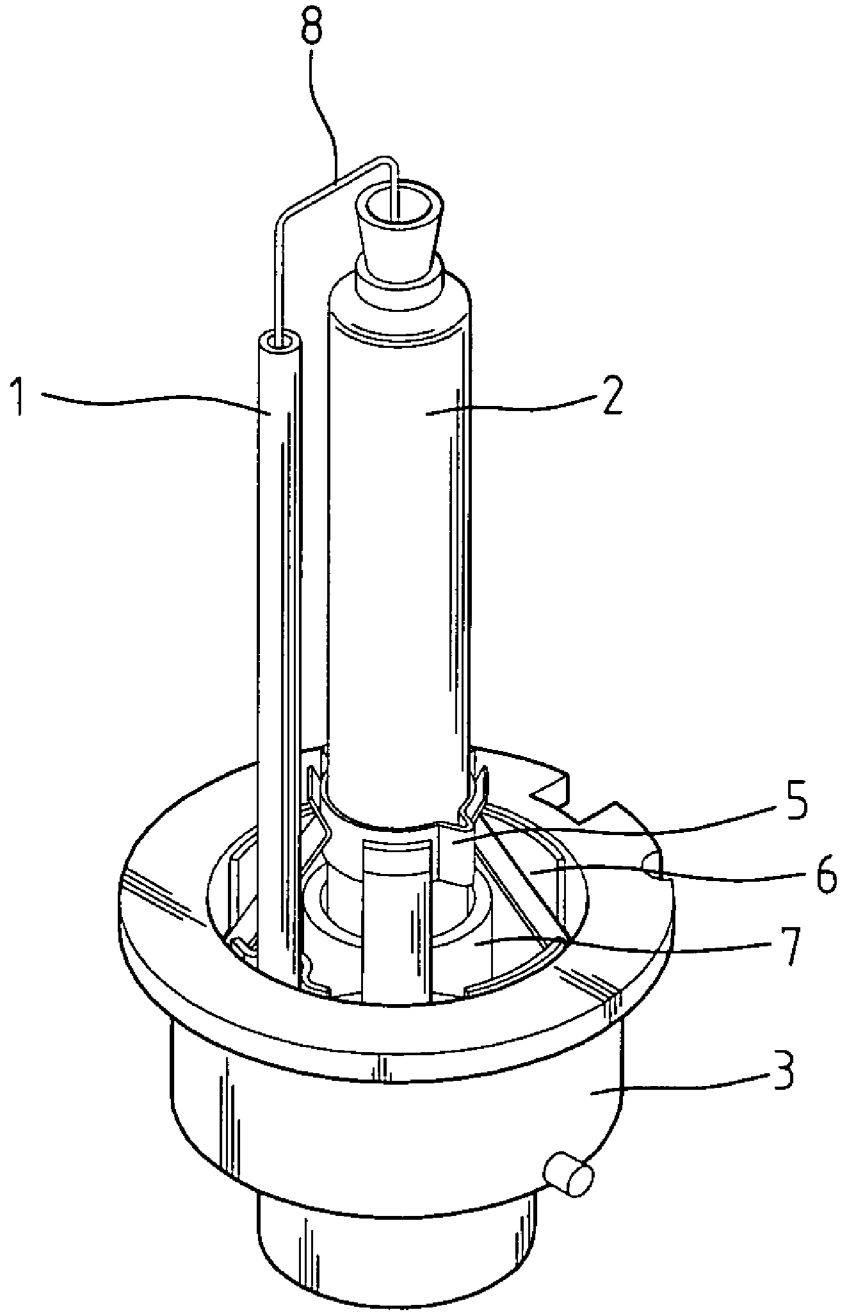
FIG. 2 (PRIOR ART)
FIG. 2 is a perspective view of the prior HID lamp.

The present invention will be described in detail by way of a preferred embodiment with reference to accompanying drawings, in which like reference numerals are used to identify the same or similar parts.

Figure 3:
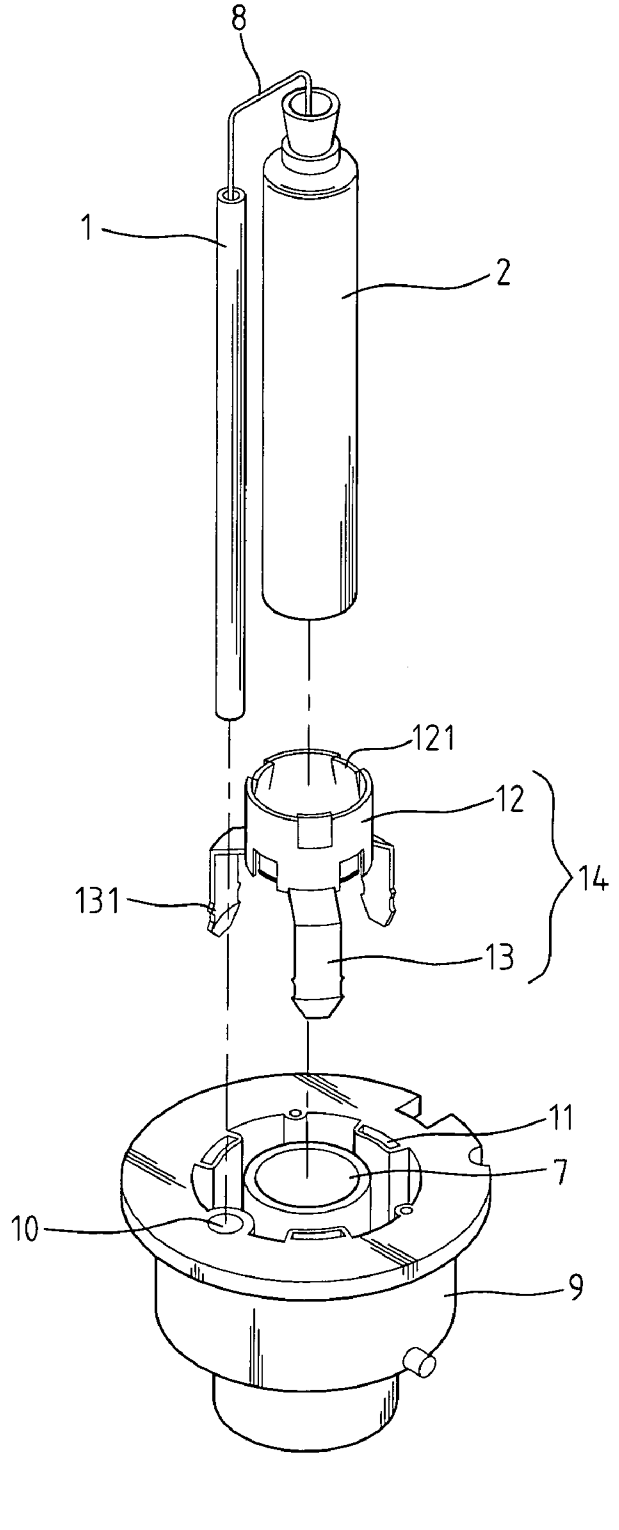
FIG. 3 is an exploded view of a HID lamp in accordance with the present invention.

Referring to FIG. 3, an improved lamp holder for a HID lamp in accordance with the present invention mainly comprises a base 9 and a metallic positioning member 14.

The base 9 is a cylindrical body with steps in an outer surface thereof and has a recess, a circular ring 7 received in a center of the recess and having a slightly larger diameter than a lamp tube 2 for receiving an end of the lamp tube 2, three insertion slots 11 arranged in equiangular on a periphery of the recess, and an insertion hole 10 located at the periphery of the recess for receiving a sleeve 1, which sleeves a lead wire 8 electrically connecting with the lamp tube 2.

The metallic positioning member 14 comprises a vibration-damping clamping ring 12, which has three protrusions 121 protruding inwards from a top rim of the clamping ring 12 and three extension feet 13 extending outwards and downwards from a bottom rim of the clamping ring 12. The extension feet 13 are mounted to the corresponding three insertion slots 11 of the base 9 so that the positioning member 14 is coupled with the base 9. Each extension foot 13 has two protruding hooks 131 provided at both sides thereof to prevent the extension feet 13 of the positioning member 14 from escaping from the insertion slots 11 of the base 9 after being assembled; and Each extension feet 13 has a triangular portion at a free end thereof so as to be easily inserted into its corresponding insertion slot 11.

Figure 4:
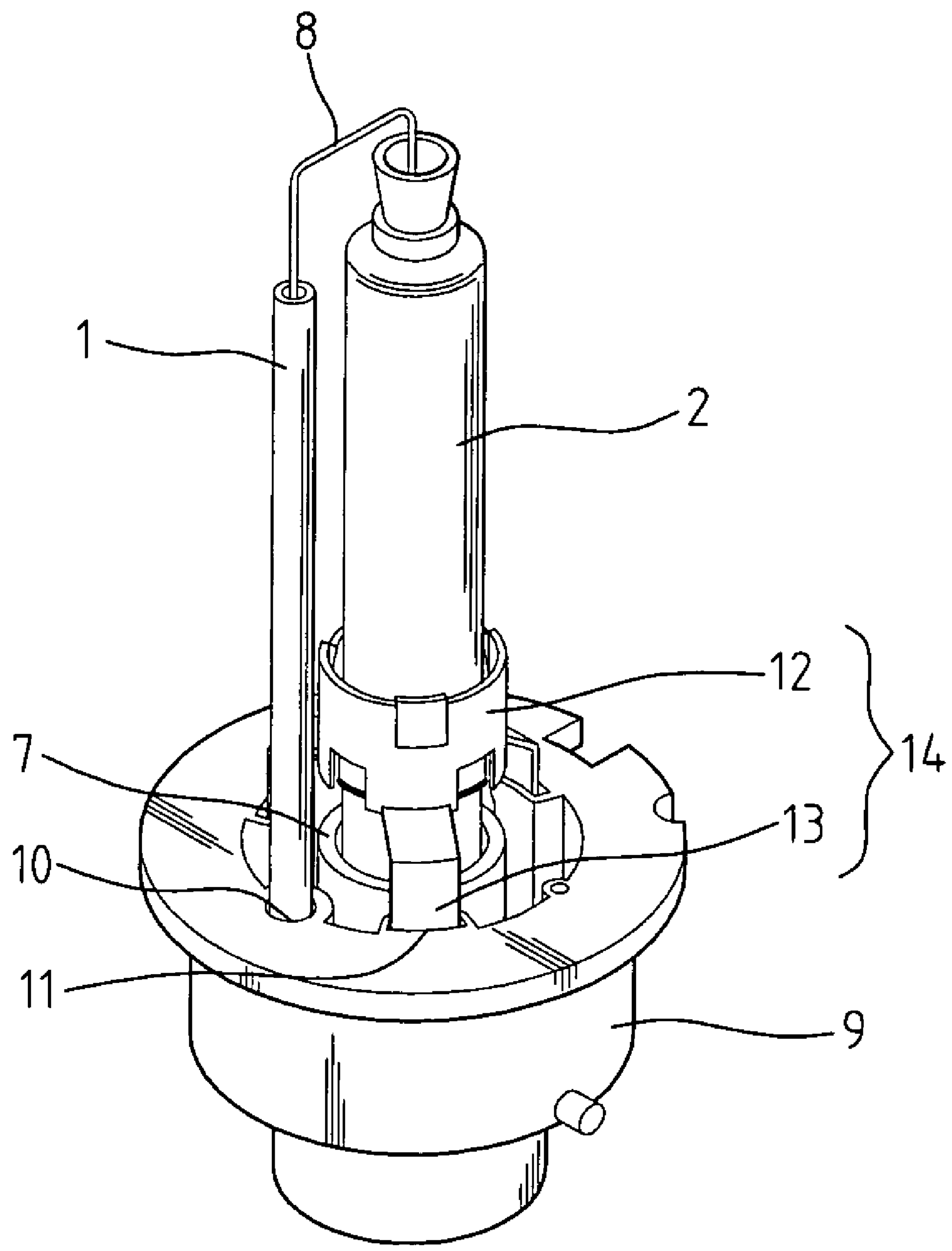
FIG. 4 is a perspective view of the HID lamp of the present invention.

Referring to FIG. 4, in assembling, the three extension feet 13 of the positioning member 14 are inserted into the insertion slots 11 of the base 9, in which the protruding hooks 131 of the extension feet 13 are completely inserted inside the insertion slots 11, and the clamping ring 12 is in alignment located above the circular ring 7. The lamp tube 2 goes through the clamping ring 12 and farther goes into and is fixed inside the circular ring 7 of the base 9. In the meantime the protrusions 121 clip the lamp tube 2 and form a buffer holder between the lamp tube 2 and the clamping ring 12, thereby preventing the lamp tube 2 from directly colliding with the clamping ring 12 due to vibration. An end of the lead wire 8 connects with the lamp tube 2, and the other end thereof extends outwards and then goes downwards. A sleeve 1 partially wrapping the lead wire 8 is inserted into and fixed inside the insertion hole 10 of the base 9. Thereby, the lamp tube 2 and the sleeve 2 are mounted on the lamp holder.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An improved lamp holder for a high intensity discharge (HID) lamp, comprising:

a base having a recess, a circular ring received in a center of the recess and receiving an end of a lamp tube, three insertion slots arranged on a periphery of the recess, and an insertion hole located at the periphery of the recess for receiving a sleeve; and a metallic positioning member comprising a vibration-damping clamping ring having three extension feet extending outwards and downwards from a bottom rim of the clamping ring, the extension feet being mounted to the corresponding insertion slots of the base whereby the positioning member is coupled with the base;

wherein the clamping ring of the positioning member has a plurality of protrusions protruding inwards from a top rim of the clamping ring whereby after the lamp tube goes through the clamping ring, the protrusions clip the lamp tube and form a buffer holder between the lamp tube and the clamping ring, thereby preventing the lamp tube from directly colliding with the clamping ring due to vibration.

2. The improved lamp holder as claimed in claim 1, wherein the extension feet each have two protruding hooks provided at both sides thereof to prevent the extension feet of the positioning member from escaping from the insertion slots of the base after being assembled.

3. The improved lamp holder as claimed in claim 1, wherein the extension feet each have a triangular portion at a free end thereof so as to be easily inserted into their corresponding insertion slots.

* * * * *